United States Patent
Yoon et al.

(10) Patent No.: US 7,826,573 B2
(45) Date of Patent: Nov. 2, 2010

(54) METHOD OF IDENTIFYING A SPACE-TIME ENCODED SIGNAL IN A WIRELESS COMMUNICATION SYSTEM

(75) Inventors: Young Cheul Yoon, San Diego, CA (US); Sang Gook Kim, San Diego, CA (US); Li-Hsiang Sun, San Diego, CA (US); Shu Wang, San Diego, CA (US)

(73) Assignee: LG Electronics, Inc., Seoul (KR)

( * ) Notice: Subject to any disclaimer, the term of this patent is extended or adjusted under 35 U.S.C. 154(b) by 1037 days.

(21) Appl. No.: 11/536,561

(22) Filed: Sep. 28, 2006

(65) Prior Publication Data

US 2007/0086537 A1    Apr. 19, 2007

Related U.S. Application Data

(60) Provisional application No. 60/722,006, filed on Sep. 28, 2005.

(51) Int. Cl.
*H04J 3/24* (2006.01)
(52) U.S. Cl. ........................ 375/349; 375/265
(58) Field of Classification Search ............... 455/103, 455/91, 452.1, 562.1, 504, 69, 132, 130, 455/272, 296; 375/267, 260, 299, 295, 345, 375/337; 370/203, 427
See application file for complete search history.

(56) References Cited

U.S. PATENT DOCUMENTS

| | | | |
|---|---|---|---|
| 5,930,240 A | 7/1999 | Wichman | |
| 5,943,326 A | 8/1999 | Schroderus | |
| 6,728,302 B1 | 4/2004 | Dabak et al. | |
| 7,123,887 B2 * | 10/2006 | Kim et al. | 455/103 |
| 7,340,669 B2 | 3/2008 | Shen | |
| 7,428,268 B2 | 9/2008 | Shen et al. | |
| 2002/0060996 A1 | 5/2002 | Kwak et al. | |
| 2002/0131382 A1 | 9/2002 | Kim et al. | |
| 2002/0163980 A1 | 11/2002 | Ruohonen | |

(Continued)

FOREIGN PATENT DOCUMENTS

EP    1056237    11/2000

(Continued)

OTHER PUBLICATIONS

Chase, D., "Code Combining—A Maximum-Likelihood Decoding Approach for Combining an Arbitrary Number of Noisy Packets," IEEE Transactions on Communications, May 1985, vol. 33, No. 5, pp. 385-393, XP000758537.

(Continued)

*Primary Examiner*—Brenda Pham
(74) *Attorney, Agent, or Firm*—Lee, Dong, Degerman, Kang & Waimey

(57) ABSTRACT

A method of identifying a space-time encoded signal in a wireless communication system having at least two different decoder types is disclosed. The method includes receiving at least one pilot signal from a transmitting end, wherein the pilot signal is represented by either Type 0 or Type 1, determining which of Type 0 or Type 1 is represented in the received pilot signal, and activating the space-time decoder for performing space-time decoding, if the pilot signal is Type 1.

12 Claims, 4 Drawing Sheets

Two carriers, two hops (one RS)
With space-time coding

U.S. PATENT DOCUMENTS

| | | |
|---|---|---|
| 2002/0172162 A1 | 11/2002 | Goodings |
| 2003/0211828 A1 | 11/2003 | Dalgleish et al. |
| 2004/0102219 A1 | 5/2004 | Bunton et al. |
| 2004/0266338 A1 | 12/2004 | Rowitch |
| 2005/0020295 A1 | 1/2005 | Attar et al. |
| 2005/0130672 A1 | 6/2005 | Dean et al. |
| 2006/0109810 A1 | 5/2006 | Au et al. |
| 2007/0019761 A1 | 1/2007 | Park et al. |
| 2008/0117896 A1 | 5/2008 | Romero et al. |
| 2008/0165720 A1 | 7/2008 | Hu et al. |
| 2009/0116420 A1 | 5/2009 | Jeong et al. |

FOREIGN PATENT DOCUMENTS

| | | |
|---|---|---|
| KR | 10-2003-0037360 | 5/2003 |
| WO | 2002-078210 | 10/2002 |
| WO | 2003003672 | 1/2003 |
| WO | WO 03/088521 | 10/2003 |
| WO | WO 2004/040799 | 5/2004 |

OTHER PUBLICATIONS

Kramer, G. et al., "Cooperative Strategies and Capacity Theorems for Relay Networks," IEEE Transactions on Information Theory, Sep. 2005, vol. 51, No. 9, pp. 3037-3063, XP011138237.

Laneman, J. N. et al., "Cooperative Diversity in Wireless Networks: Efficient Protocols and Outage Behavior," IEEE Transactions on Information Theory, Dec. 2004, vol. 50, No. 12, pp. 3062-3080, XP 011122855.

Laneman, J. N. et al., "Distributed Space-Time-Coded Protocols for Exploiting Cooperative Diversity in Wireless Networks," IEEE Transactions on Information Theory, Oct. 2003. Volume 49, No. 10, pp. 2415-2425, XP011102231.

Ochiai, H. et al., "Design and Analysis of Collaborative Diversity Protocols for Wireless Sensor Networks," IEEE 60th Vehicular Technology Conference, 2004, vol. 7, pp. 4645-4649, XP010790292.

* cited by examiner

Two carriers, two hops (one RS)
With space-time coding

Single carrier (TDM), two hops

METHOD OF IDENTIFYING A SPACE-TIME ENCODED SIGNAL IN A WIRELESS COMMUNICATION SYSTEM

This application claims the benefit of U.S. Provisional Application No. 60/722,006, filed on Sep. 28, 2005, which is hereby incorporated by reference.

BACKGROUND OF THE INVENTION

1. Field of the Invention

The present invention relates to a method of identifying encoded signals, and more particularly, to a method of identifying a space-time encoded signal in a wireless communication system.

2. Discussion of the Related Art

A Broadcast Multicast Service (BCMCS) provides the ability to transmit the same information stream to multiple users simultaneously. More specifically, the BCMCS is intended to provide flexible and efficient mechanism to send common or same information to multiple users. The motivation for this service is to achieve the most efficient use of air interface and network resources when sending the same information to multiple users. The type of information transmitted can be any type of data (e.g., text, multimedia, streaming media). The BCMCS is delivered via the most efficient transmission technique based on the density of the BCMCS users, information (media type) being transmitted, and available wireless resources.

Transmission territory for each BCMCS program can be independently defined. Here, the BCMCS program refers to a logical content transmitted using the BCMCS capabilities. Moreover, the BCMCS program is composed of one or more internet protocol flows. In operation, the programs can be transmitted in time sequence on a given channel. The BCMCS programs can be transmitted to all or selected regions of the network. These regions constitute the transmission territory which refers to an area of wireless network coverage where transmission of a BCMCS program can occur. The transmission territory can be defined by a set of cells/sectors that can transmit a BCMCS program. In addition, the BCMCS programs can be received by all users or can be restricted to a subset of users via encryption.

In the BCMCS, retransmission and acknowledgement are not required since the type of transmission is "one way" and/or "one to many."

The BCMCS subscription is normally associated with the program (e.g., ABC, TNT, ESPN), not the content (media type such as music, video, etc.). That is, by selecting the program, the user selects the type of content the user wishes to receive.

In addition, a receiver in the BCMCS over cellular networks employing a space-time coding (STC) scheme. More specifically, the STC scheme is employed to improve the reliability of data transmission in wireless communication systems using multiple transmit antennas. STCs rely on transmitting multiple, redundant copies of a data stream to the receiver in the hope that at least some of them may survive the physical path between transmission and reception in a good enough state to allow reliable decoding.

As for the receiver, it is important for the receiver to have the capability to properly and efficiently decode the received signals and determine whether or not the system is transmitting a space-time encoded signal. To this end, there may be need for the network to transmit extra information via the upper layer broadcast message indicating that space-time coding is being used. The problem with is that extra information incurs overhead. In addition, the use of space-time coding at the transmitter implies the need for a special space-time decoder with increased complexity relative to the receiver for the system without space-time coding turned on (i.e., regular transmission). However, the problem with this is that a more complex space-time decoder is needed.

SUMMARY OF THE INVENTION

Accordingly, the present invention is directed to a method of identifying a space-time encoded signal in a wireless communication system that substantially obviates one or more problems due to limitations and disadvantages of the related art.

An object of the present invention is to provide a method of identifying a space-time encoded signal in a wireless communication system having at least two different decoder types.

Another object of the present invention is to provide a method of selecting a decoder type in a wireless communication system having at least two different decoder types.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of identifying a space-time encoded signal in a wireless communication system having at least two different decoder types is disclosed. The method includes receiving at least one pilot signal from a transmitting end, wherein the pilot signal is represented by either Type 0 or Type 1, determining which of Type 0 or Type 1 is represented in the received pilot signal, and activating the space-time decoder for performing space-time decoding, if the pilot signal is Type 1.

In another aspect of the present invention, a method of method of selecting a decoder type in a wireless communication system having at least two different decoder types is disclosed. The method includes receiving at least two pilot signals from a transmitting end, wherein each pilot signal is represented by various pilot signal types, determining the pilot signal type of each received pilot signal, decoding a portion of each received pilot signal using at least two decoders, each decoder corresponding to each pilot signal type, and determining the decoder type for a selected pilot signal, the pilot signal is selected based on the decoded portion of the pilot signal having a better signal-to-noise ratio (SNR).

In a further aspect of the present invention, a method of selecting a decoder type in a wireless communication system having at least two different decoder types is disclosed. The method includes receiving at least two pilot signals from a transmitting end, decoding a portion of each received pilot signal using a default decoder, and determining the decoder type based on a signal type of the decoded portion of the signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
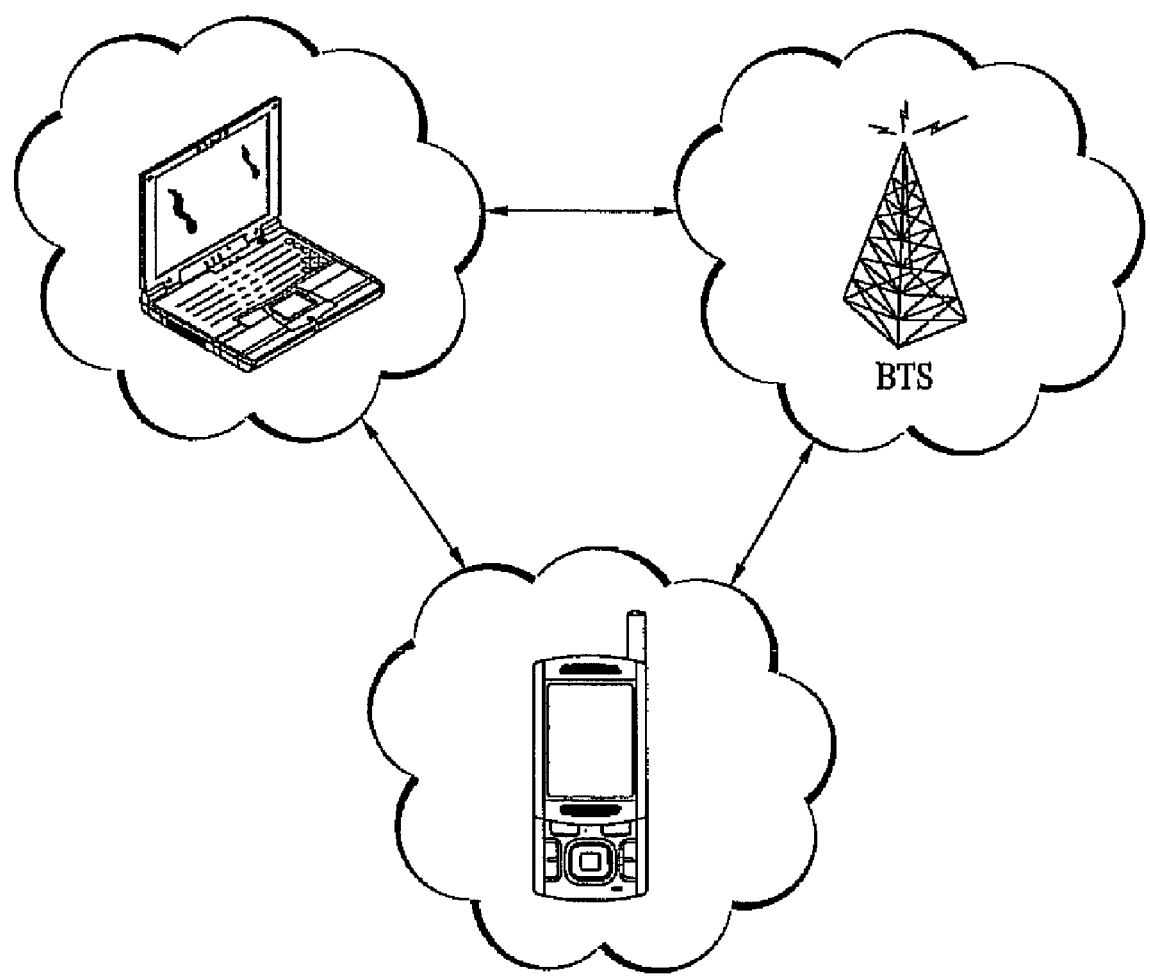
FIG. 1 illustrates a plurality of modules that are respectively one hop apart.

Currently, the BCMCS over cellular networks are based on single-hop networks. The single hop network refers to a network where all entities/modules are a maximum of one hop apart. FIG. 1 illustrates a plurality of modules that are respectively one hop apart. In FIG. 1, two MSs and a base terminal station (BTS) are one hop apart respectively.

To improve service throughout the coverage area and capacity, multiple hops (two or more hops) can be used. More specifically, two or more hops through relaying can be employed to provide more consistent service and improved capacity. To this end, a relay station (RS) can be introduced in the network represented by the usual BTS and MS.

Figure 2:
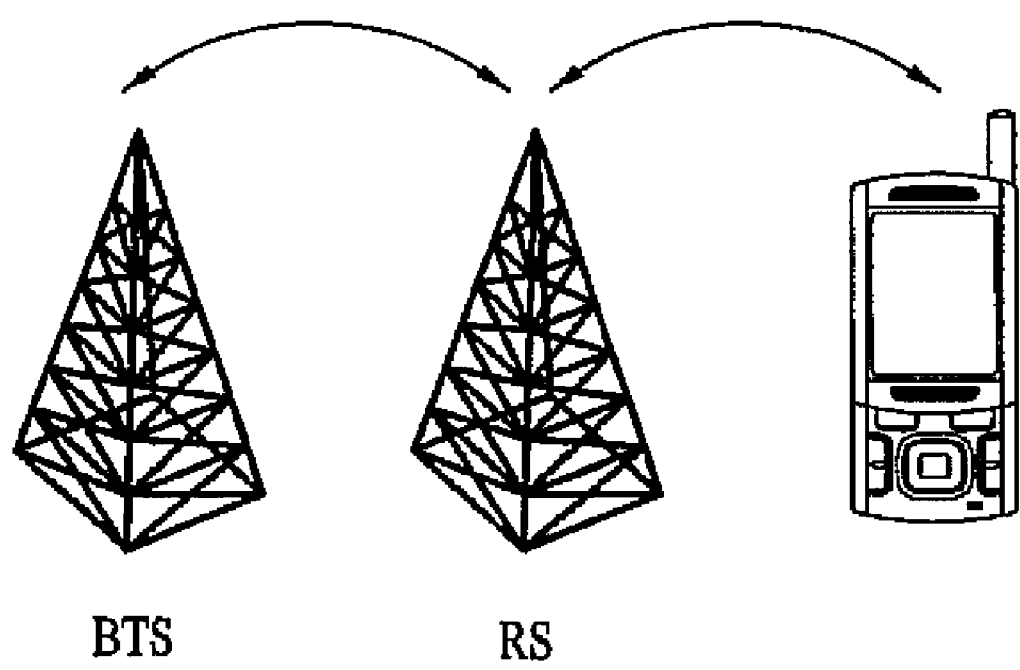
FIG. 2 is a diagram illustrating an example of a relay station (RS) in a multi-hop system.

FIG. 2 is a diagram illustrating an example of a RS in a multi-hop system. As shown in FIG. 2, the RS is placed between the BTS and the MS. The function of the RS is to 'repeat' the BTS signal in a trivial or a smart manner so as to extend the BCMCS coverage. According to the conventional system, the MSs positioned away from the BTS (e.g., near the cell border) often experience failed signal due to weakened signal strength or interference due to signals from neighboring cells/sectors. With the extended BCMCS coverage, however, the MS's, that would otherwise unable to receive strong enough signal, can demodulate and decode the BCMCS signal.

As mentioned above, the function of the RS can be accomplished in a trivial or smart manner, for example. The trivial manner refers to relaying the signal through simple signal repetition. Alternatively, the smart manner refers to employing space-time coding to achieve transmit diversity or incremental redundancy (IR).

Here, the RS can be equipped with multiple antennas to achieve transmit diversity. A multi-input, multi-output (MIMO) can provide transmit diversity to increase efficiency of wireless resources. The use of multiple antennas provides the RS and other terminals (e.g., mobile station) to achieve diversity gain without increase in broadband. For example space-time code (STC) can be used to increase reliability of communication links, spatial multiplexing (SM) can be used to increase transmission capacity, or a full diversity full rate space time code (FDFR-STC) can be used to achieve full diversity.

Figure 3:
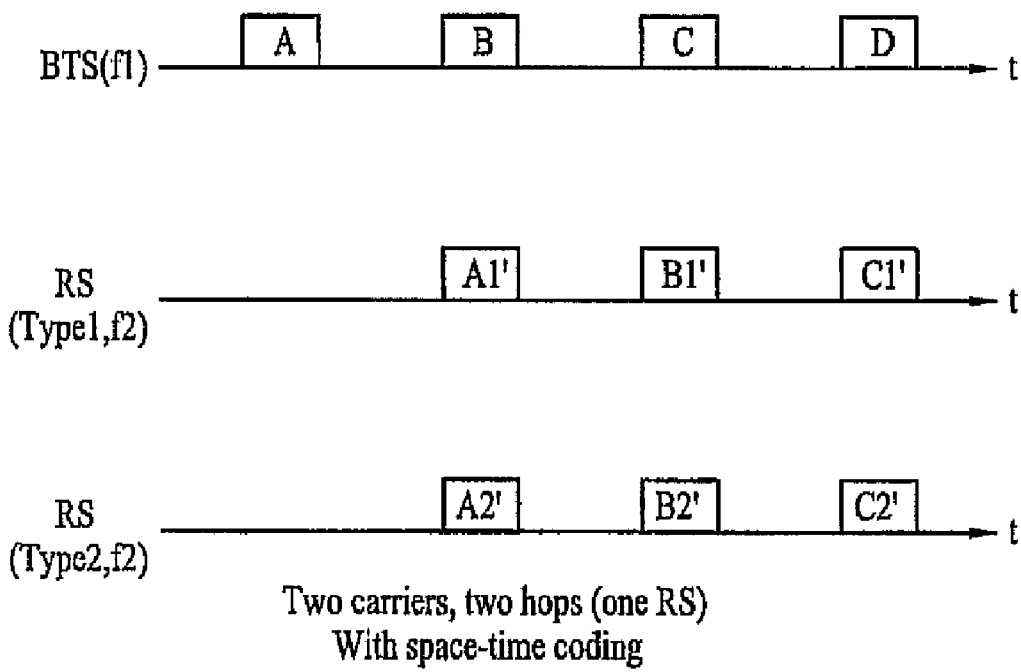
FIG. 3 illustrates a scheme for a relayed BCMCS according to an embodiment of the present invention.

FIG. 3 illustrates a scheme for a relayed BCMCS according to an embodiment of the present invention. In FIG. 3, a space-time coding is introduced in a multi-hop system having two frequency carriers (i.e., f1 and f2) and one RS.

The BTS broadcasts BCMCS packets (e.g., A, B, C, D) in sequence on a frequency (i.e., f1). The RS then receives the broadcasted BCMCS packets and decodes them before transmitting a 'relayed signal' to the MS. That is, for example, after the RS receives packet A broadcasted from the BTS on f1 and decodes packet A, the RS can then transmit packet A1' and packet A2' (also referred to as 'relayed signals') to the MS using a different frequency (i.e., f2). The relayed signals can be based on simple repetition or space-time encoding, for example. For simple repetition, packet A would simply relay the original signal, thus packet A=packet A1'=packet A2'. Alternatively, space-time coding can be used to exploit transmit diversity.

For transmit diversity, in FIG. 3, the BCMCS packets transmitted to the MS by the RS are divided into two types—Type 1 and Type 2. Here, the RS can be divided into two types (i.e., Type 1 and Type 2) based on the RS sharing one frequency and/or based on the RS having two antennas. However, the RS is not limited to having two antennas but can have more than two antennas. As discussed above, the RS decodes the BTS' transmission of packet A and transmits the 'relayed signals' A1' and A2' for RS of Type 1 and RS of Type 2, respectively. For example, the RS Type 1 transmits the same signal or repeated packet (e.g., packet A') such that packet A=packet A1'. At the same time, the RS Type 2 transmits a space-time encoded version, packet A2', instead to provide transmit diversity. Here, the space-time code can be based on an Alamouti scheme, for example (for details of Alamouti scheme, see Alamouti, S. M. *A Simple Transmit Diversity Technique for Wireless Communications*, IEEE Journal on Select Areas in Communications, Vol. 16, No. 8, (October 1998), pp. 1451-1458). Since packet A1' and packet A2' are sent on the same frequency (i.e., f2) at the same transmission time slot, the relayed signal for Type 1 and Type 2 should be in a different format. That is, if Type 1 is a simple repetition of the original packet, then Type 2 is space-time encoded, and vice versa.

Figure 4:
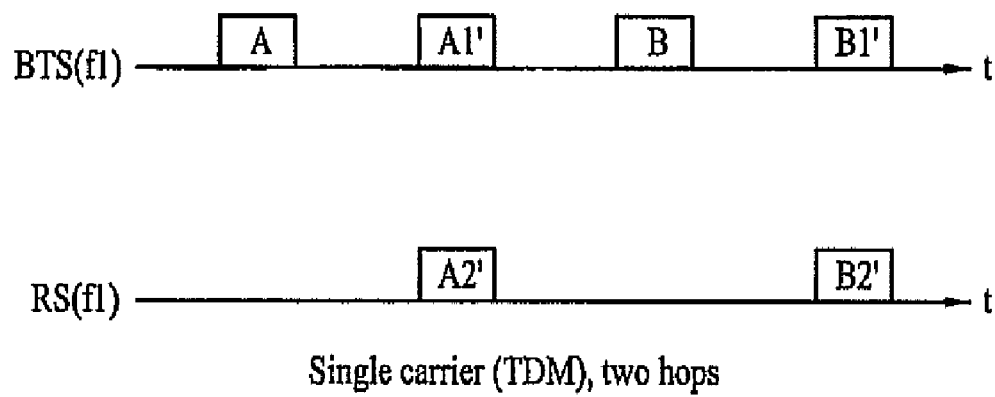
FIG. 4 illustrates a scheme for a relayed BCMCS according to another embodiment of the present invention.

FIG. 4 illustrates a scheme for a relayed BCMCS according another embodiment of the present invention. In FIG. 4, a single frequency carrier having a time-division multiplexing (TDM) is applied in a multi-hop system.

Since the BTS and the MS share the same spectrum in a time division multiplexing (TDM) fashion, the transmission time for a single packet is doubled. As described above, the BTS broadcasts the original signal (i.e., packet A) during the first transmission time slot. The RS then receives and decodes the BTS' transmission of packet A. Thereafter, the RS transmits a 'relayed signal' A2' during the subsequent transmission time slot. Here, packet A2' can be simple repetition of packet A or can be space-time encoded. At the same transmission time slot, the BTS retransmits packet A now in form of packet A1'. Here, packet A1' can be simple repetition of packet A, space-time encoded packet A, or different parity bit packet A. In short, there are a number of options for designing the relayed signal A2' and the BTS retransmitted signal A1'. For example, both packet A1' and packet A2' can be simple repetition where packet A1'=packet A2'=packet A. Alternatively, packet A1' and packet A2' can be space-time encoded.

Similar arrangement can be applied to subsequent BTS transmissions (e.g., packet B and packets B1'/B2').

As described above, the transmitting end can send the signals in various forms, including space-time encoded signals. Here, the transmitting end can be a BTS or a RS. It is important that these transmitted signals are successfully received and decoded by the receiver.

In order to resolve the problems associated with the current design of the receiver which can incur unwanted overhead and/or require a special complex space-time decoder, as described above, the receiver should be designed so that it can determine whether or not the system is transmitting a space-time encoded signal. More detailed information regarding a space-time decoder can be found in "Gesbert, David, *From Theory to Practice: An Overview of MIMO Space-Time Coded Wireless System's*, IEEE Journal on Selected Areas in Communications, Vol. 21, No. 3, (April 2003), pp. 281-302."

In the system which employs Alamouti space-time codes, the pilot tones are space-time coded if space-time coding is activated. Similarly, the converse is true if space-time coding is not activated. In the present invention, assume that Type 0 sectors transmit the original pilot signal while Type 1 sectors transmit a space-time encoded pilot signal.

Figure 5:
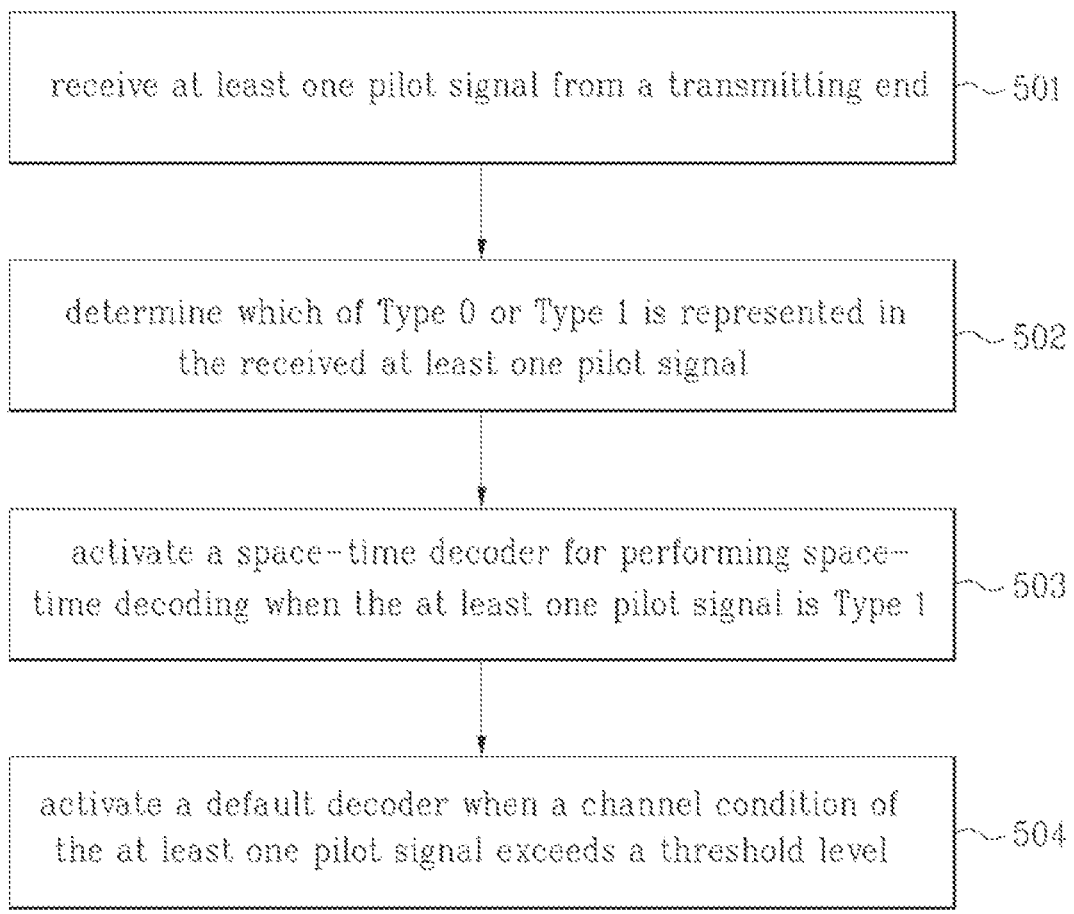
FIG. 5 is a flowchart illustrating an identification of a space-time encoded signal according to one embodiment.

As an embodiment of the present invention, the determination as to whether the system is transmitting a space-time encoded signal can be made possible by having the MS process the pilot signals or pilot tones in a smart manner (see, for example, FIG. 5). That is, since the pilot signals include different signal patterns, the MS can recognize different patterns based on the pilot signal. More specifically, this means that when the pilot signal is space-time encoded, the pilot signals have a certain pattern. Alternatively, when space-time coding is not activated which means that the pilot signal is not space-time encoded, the pilot signals have a different pattern from that of the space-time encoded pilot signal. In essence, this distinction enables the MS to determine whether or not the received pilot signal is space-time encoded, allowing the MS to process the pilot signals smartly.

The MS can process the pilot signal and attempt to detect the Type 1 pilot signal (space-time encoded pilot signal). The detection can be performed by one of many available methods such as a Neyman Pearson method.

If the Type 1 pilot signal is detected, then the MS assumes that the received pilot signal is space-time encoded or put differently, space-time coding has been activated. Further, if the Type 1 pilot signal is detected but the Type 0 pilot signal is not, then the MS decodes using space-timing coding.

Alternatively, if the Type 0 pilot signal is detected but the Type 1 pilot signal is not, then the MS decodes using the regular decoder (e.g., no space-time coding). If both the Type 0 and the Type 1 pilot signals are detected, then a default decoder can be used. Here, the default decoder can be pre-set. However, if neither the Type 0 nor the Type 1 pilot signal is detected, then the space-time decoder can be used.

Alternatively, the MS can process the BCMCS signal by using the regular detector, also referred as a default decoder. If and when the BCMCS reception quality is sufficiently good, the MS can assume that the pilot signal is not space-time encoded and can process the pilot signal in a usual manner in which the pilot signal is decoded as if the pilot signal is not space-time encoded. In other words, the received pilot signal can be processed by the default decoder. Here, the reception quality can be measured using the signal-to-noise ratio (SNR) of the two pilots (SNR for Type 1 pilot and SNR for Type 2 pilot), for example. If, however, the BCMCS reception quality is poor or insufficient, the MS can use the space-time decoder. In the event that the space-time decoder performs better than the default decoder, then the MS can assume that the pilot signal is space-time encoded and switch over to the space-time decoder. It is also possible to set the space-time decoder as the default decoder in the present invention.

Alternatively, the MS can decode the BCMCS signal with the default decoder and the space-time decoder. In this case, the MS receives at least two pilot signals and determines the pilot signal type of each pilot signal. For example, the pilot signal type of the pilot signal could be Type 0 (non-space-time encoded) or could be Type 1 (space-time encoded). Based on the determined pilot signal type (e.g., Type 0 or Type 1), the MS uses the decoders corresponding to each pilot signal type to detect a portion of each pilot signal. The detected portions of the pilot signals are then compared, and the pilot signal having better output is selected.

Alternatively, a combination of the above schemes can also be used.

As another embodiment of the present invention, the receiver design can be simplified. If the MS receives a sufficiently strong signal from the system, the MS need not perform space-time decoding which typically requires additional signal processing. Instead, the MS can implement a much simpler receiver.

If the MS is in a sufficiently good channel condition, the MS may not need to perform space-time decoding. More specifically, the MS can receive at least two pilot signals. The MS then detects a portion or about half of each pilot signal using a default decoder. If the portion or half of the pilot signal is successfully detected, then the MS can continue to use the default decoder to decode rest of the pilot signal. When the default decoder is used, it signifies that the pilot signal is not space-time encoded. For example, if the MS receives the Type 0 pilot signal, which signifies absence of space-time encoding, the default decoder is employed.

If, however, the portion or half of the received pilot signal is not successfully decoded, then the MS can switch to or use the space-time decoder to decode the pilot signal. When the space-time decoder is used, it signifies that the pilot signal is space-time encoded. For example, if the MS receives a combined Type 1 and Type 0 pilot signal, which signifies presence of space-time encoding, the space-time decoder is employed.

Further, if the MS determines that is cannot detect a Type 1 signal, the MS can decide to demodulate the Type 0 signal as if there were not space-time encoding. Similarly, if the MS does detect the Type 1 signal but cannot detect a Type 0 signal, the MS can decide to demodulate the Type 1 signal as explained above.

It is important to note that the embodiments of above are not limited to space-time coding schemes but can also be applied to other space-time codes. Further, the system, as discussed above, is not limited to the BCMCS system, but also be applied to cellular networks, point-to-point system, and/or any other types of systems that applies transmit diversity.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of identifying a space-time encoded signal in a wireless communication system having at least two different decoder types, the method comprising:

receiving at least one pilot signal from a transmitting end, wherein the at least one pilot signal is represented by either Type 0 or Type 1;

determining which of Type 0 or Type 1 is represented in the received at least one pilot signal;

activating a space-time decoder for performing space-time decoding when the at least one pilot signal is Type 1; and activating a default decoder when a channel condition of the at least one pilot signal exceeds a threshold level.

2. The method of claim 1, wherein each of the at least one pilot signal represents a certain pattern.

3. The method of claim 1, wherein Type 0 represents a non-space-time encoded signal, and Type 1 represents a space-time encoded signal.

4. The method of claim 1, further comprising activating the space-time decoder when the channel condition of the at least one pilot signal is below the threshold level.

5. The method of claim 1, further comprising activating the default decoder when the at least one pilot signal is Type 0.

6. The method of claim 1, wherein the channel condition is represented by a Forward Error Rate (FER).

7. The method of claim 1, wherein the Type 0 pilot signal and the Type 1 pilot signal contain same information.

8. A method of selecting a decoder type in a wireless communication system having at least two different decoder types, the method comprising:

receiving at least two pilot signals from a transmitting end, wherein each of the at least two pilot signals is represented by various pilot signal types;

determining the pilot signal type of each of the received at least two pilot signals;

decoding a portion of each of the received at least two pilot signals using at least two decoders, each decoder corresponding to one of the pilot signal types; and determining the decoder type for a selected pilot signal of the received at least two pilot signals, the selected pilot signal selected based on the decoded portion of a corresponding one of the received at least two pilot signals having a signal-to-noise ratio (SNR), wherein the decoded portion of each of the received at least two pilot signals equals half of the corresponding pilot signal.

9. The method of claim 8, wherein the various pilot signal types include space-time encoded signals.

10. The method of claim 8, wherein at least one of the at least two decoders is a space-time decoder.

11. The method of claim 8, wherein each of the various pilot signal types is represented by either Type 0 or Type 1.

12. The method of claim 11, wherein Type 0 represents a non-space-time encoded signal, and Type 1 represents a space-time encoded signal.

\* \* \* \* \*